Feb. 21, 1939.                A. ALFORD                2,147,810
          METHOD AND MEANS FOR DETERMINING DISTANCE
                   BY MEANS OF RADIATED WAVES
                      Filed Dec. 10, 1937
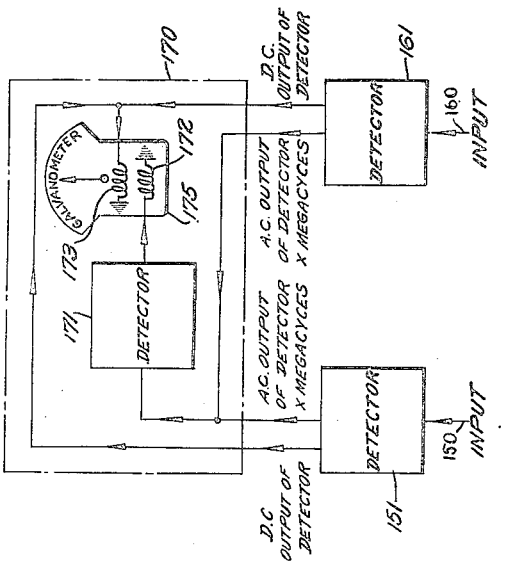
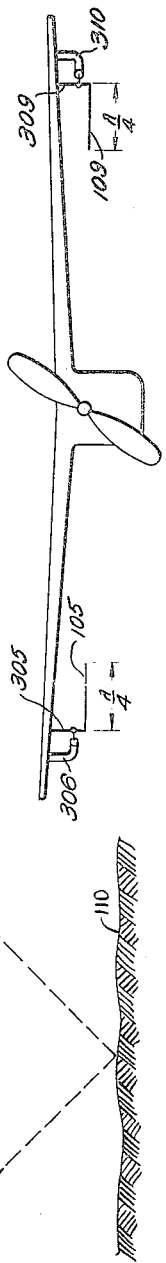
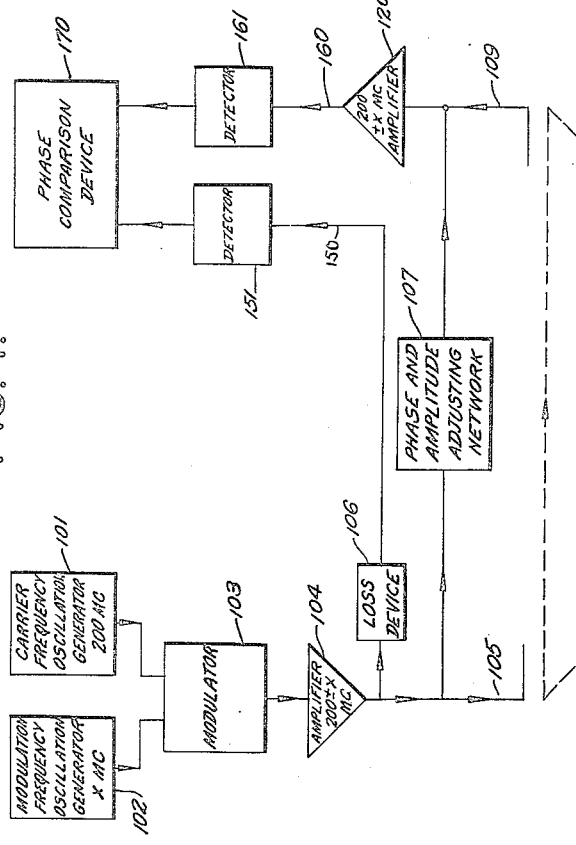
INVENTOR
ANDREW ALFORD
BY
ATTORNEY ized-cased-v1.0

UNITED STATES PATENT OFFICE 2,147,810

METHOD AND MEANS FOR DETERMINING DISTANCE BY MEANS OF RADIATED WAVES

Andrew Alford, San Mateo, Calif., assignor to Mackay Radio & Telegraph Company, New York, N. Y., a corporation of Delaware Application December 10, 1937, Serial No. 179,081

4 Claims. (Cl. 250—1)

The present invention relates to methods of and apparatus for determining the distance of massive objects such as the earth, by the reflection of electromagnetic waves, and especially to methods of and apparatus for determining the distance from an aeroplane to the ground by the reflection of ultra-short radio waves modulated at a somewhat lower radio frequency.

In accordance with one feature of my invention the desired determination of height, or of distance from some obstacle, is carried out by varying the frequency at which an ultra-short wave is modulated. In accordance with this method, a modulated ultra-short radio wave is transmitted and after reflection again received, and this wave is compared with an unreflected wave in a suitable manner to determine the phase delay of the modulating frequency of the reflected wave. In order to eliminate sources of error and provide a simple and yet reliable measuring method, the indicating device which shows the relative phase or time delay of the reflected and unreflected waves is employed in a qualitative rather than a quantitative manner, so that errors in calibration in this indicating device become unimportant. The frequency of the modulating waves is varied so as to cause the relative phases of the two waves being compared to pass through a convenient relationship, such as phase coincidence or phase opposition, and then after further variation through another convenient phase relationship, such as phase opposition or phase coincidence. By noting the frequency corresponding to each of these convenient phase relationships, the altitude or distance from the reflecting mass is determined with an accuracy which depends only upon the accuracy of calibration of the frequency varying means. This method may be practiced with any suitable form of apparatus including the forms of apparatus previously known. A further feature of the present invention, however, is the provision of apparatus especially adapted for the practice of the above-outlined method.

According to another feature of the present invention, the standard against which the modulation envelope of the reflected wave is compared is derived from the transmitted wave by detection, in almost the same manner as the envelope is derived from the reflected wave itself. Then these two envelope waves, both derived by detection, are compared. By such an arrangement a number of possible sources of error are eliminated, and the requirements for construction of a number of the component parts of the arrangement are made less stringent.

The exact manner of performing the novel method and of constructing the novel arrangement of the present invention may best be understood from the following detailed description taken in connection with the attached drawing, in which Fig. 1 is a schematic diagram which represents an arrangement for determining altitude in accordance with my invention;

Fig. 2 is a more detailed schematic representation of a portion of the arrangement shown in Fig. 1;

Fig. 3 is a representation of an aeroplane equipped with an arrangement in accordance with my invention.

Referring now more particularly to Fig. 1, 101 is an oscillation generator for producing an ultra-short wave radio carrier whose frequency is substantially higher than the highest frequency to be used for modulation. The waves for modulating this carrier are supplied by a modulation frequency oscillation generator 102, which is adapted to be readily and quickly varied during flight so as to vary the frequency of the waves which it generates. This modulation frequency oscillation generator is preferably capable of generating frequencies of the order of 5 megacycles, i. e. between .5 megacycle and 50 megacycles. In case it is desired to remove all possible ambiguity of altitude indication, even at altitudes considerably in excess of 1,000 feet, the modulation frequency oscillation generator 102 may be arranged so that it will generate frequencies considerably lower than .5 megacycle but this is not absolutely essential. For the sake of definiteness, it will be assumed in the following description, that the frequency of generator 101 is 200 megacycles and that the modulation frequency generator 102 is capable of generating all frequencies between ¼ of a megacycle and 30 megacycles. The outputs from generators 101 and 102 are applied to modulator 103. This modulator then delivers a carrier wave of 200 megacycles modulated at a frequency of X megacycles, where X may be any number between ¼ and 30, to amplifier 104 from the output of which the amplified waves are conducted to antenna 105. Also from the output of amplifier 104 a portion of the waves are transmitted through loss device 106 to line 150, to serve as a standard against which the waves transmitted from antenna 105 and reflected from the ground can be compared. This loss device 106 may consist of an adjustable attenuation pad preferably exhibiting very little phase variation with changes in frequency, or may consist merely of a suitable loose coupling, or of a loose coupling together with an adjustable attenuation pad. Transmitting antenna 105 is designed so as to transmit very little energy directly to receiving antenna 109, but this transmitting antenna does radiate strongly towards the ground, which is designated by reference character 110. By reflection from the ground, therefore, a considerable amount of energy indirectly arrives at receiving antenna 109 from transmitting antenna 105, as shown by the dotted line extending from 105 to 110 and thence to 109. Incidentally, also, a certain amount of energy is unavoidably radiated directly from antenna 105 to receiving antenna 109, as indicated by the straight dotted line directly joining these two antennae. For neutralizing this direct radiation between the antennae a small neutralizing component is led off from the output of amplifier 104 through a phase and amplitude adjusting network 107 to the receiving antenna as shown in Fig. 1, and the amplitude and phase of this component is adjusted so as to exactly neutralize the radiation component reaching antenna 109 directly from antenna 105.

From antenna 109 the energy received by reflection from the ground 110 is conducted to amplifier 120 and from the output of this amplifier to line 160. Thus in line 160 there is amplified energy corresponding to the reflected waves which have travelled from antenna 105 to ground 110 and back to antenna 109. In line 150, on the other hand, there is a corresponding wave which has not been reflected. For the purpose of comparing these two waves, the lines 150 and 160 are, in accordance with the present invention, connected to detectors 151 and 161 which detect the modulated ultra-short waves so as to yield waves corresponding to the envelopes of modulation thereof. These lower frequency waves derived from detectors 151 and 161 are applied to phase comparison device 170, which may be approximately calibrated so as to indicate roughly the extent of the phase difference between the two waves applied to it or may be merely adapted to qualitatively indicate whether the two waves are in phase coincidence or phase opposition or not.

In accordance with the above arrangement, it will be noted that phase or amplitude variations occurring in generators 101 or 102, or modulator 103, or amplifier 104, are essentially balanced out or compensated since both the reflected waves and the unreflected waves are transmitted through these portions of the apparatus. The detectors 151 and 161 are individual to the separate waves, but these detectors are preferably made of identical construction, and thus the difference in the phase shift of these two detectors is made as small as possible. The amplifier 120 is included in the path of the reflected waves only, but this amplifier can readily be arranged so as to have a comparatively small or nearly constant phase shift. Similarly the loss device 106 may be arranged so as to have essentially a negligible or constant phase shift. The elimination of variable phase shifts in devices 120 and 106 is greatly facilitated by the fact that although these devices carry waves of 200 megacycles, the phase shifts are important only in so far as they effect the phase of the lower frequency envelope. Thus if the envelope frequency is 5 megacycles a 30° phase shift of the carrier represents a phase shift of only ¾ of a degree for the envelope.

In the preferred construction of the apparatus shown in Fig. 1, the modulation frequency generator 102 is equipped with a dial or other convenient means for readily and quickly varying the generated frequency and for indicating the frequency so generated at any moment. Preferably the dial or other indicating means is graduated directly in units of wavelength rather than frequency, and preferably is graduated so as to indicate ¼ or ½ of the actual wavelength generated.

For definiteness in the following description, it will be assumed that in the embodiment shown in Fig. 1 the generator 102 is graduated and calibrated so as to indicate the length in feet which corresponds to ¼ of the wavelength generated by the oscillation generator. Thus when this generator 102 is adjusted to oscillate at a frequency of approximately .492 megacycle, which corresponds to 2,000 feet wavelength, the dial or pointer of this generator 102 will indicate 500 feet. In this embodiment the phase comparison device 170 should preferably be capable of indicating phase opposition between the reflected and unreflected waves with the dial so graduated and the device 170 so constructed the approximate height from ground may be directly read merely by adjusting the generator from its lowest frequency to the first point at which the device 170 indicates phase opposition. This first opposition between the reflected and unreflected waves will occur when the frequency is such that the distance from antenna 105 to ground 110 plus the distance from ground 110 back to antenna 109 equals ½ a wavelength. This is upon the assumption that there is no phase shift in loss device 106 or amplifier 120, or that if there is any such phase shift in either of these devices, it is suitably compensated. Upon these assumptions, therefore, the first indication of phase opposition which will be given by the phase comparison device 170 will occur when the frequency of generator 102 is raised from its lower limit to a frequency whose wavelength is four times the height of the aeroplane above the ground. Therefore, if the dial of the generator 102 is calibrated so as to read a distance equal to ¼ of the wavelength generated, this dial will directly indicate the height of the aeroplane above the ground.

It will, of course, be understood that the phase comparison device 170 may be arranged to show phase coincidence instead of showing phase oppositions. In such a case the calibration of generator 102 should preferably be modified so that the dial on this generator will indicate a distance corresponding to ½ the actual wavelength generated.

If the phase comparison device 170 is of a type which will accurately show phases, or at least the points of phase opposition and/or phase coincidence, in spite of variations in the relative or absolute amplitude of the two signals applied to it, both of the amplifiers 104 and 120 as well as the modulator and oscillator, may be constructed very simply. If, however, this phase comparison device 170 is somewhat effected by alteration in the relative strength of the signals, it is desirable to eliminate or minimize the variations in amplitudes of these signals, or at least to arrange the system so that these variations will not take place as rapidly as the adjustments which are used for determining an altitude. Because of the fact that the radiant path between antenna 105 and antenna 109 by way of ground 110 is likely to vary comparatively rapidly in attenuation, it is preferred to equip amplifier 120 with one of the known forms of automatic gain control so that the output of this amplifier will be substantially constant at least over a short period of time. The amplifier 104 may also be similarly equipped, but this is not ordinarily necessary since the modulator and oscillator will be comparatively stable in amplitude except for slow drifts, and since the readings of phase opposition or coincidence will ordinarily be independent of the relative or absolute wave amplitudes provided these amplitudes do not vary during the time the modulation frequency is being adjusted.

The preferred form of phase comparison device 170 is more fully illustrated in Fig. 2, which shows detectors 151 and 161 and phase comparison device 170 as well as the schematic connections between them. As can readily be seen from Fig. 2, the outputs of the two detectors are separated into the A. C. components which represent the envelope of the modulated waves fed into these detectors, and the D. C. components which are essentially proportionate to the average value of the carriers fed into these detectors. Then the two A. C. outputs are directly added together vectorially and then applied to a third detector 171. The output of this detector 171 is then a direct current which represents the mean value of the vectorial sum of the envelopes of the two waves being compared, being a minimum when these two waves are in phase opposition and a maximum when they are in phase coincidence. This direct current output of detector 171 is then applied to one coil 172 of a two-coil galvanometer 175. To the other coil 173 of this galvanometer 175 there is applied the sum of the direct current output of detectors 151 and 161. It is clear that if the waves fed into detectors 151 and 161 did not vary at all in amplitude, the coil 173 and the connections therefor could be omitted. Since, however, there will be some variation in the relative strength of the waves fed into detectors 151 and 161 even in spite of the use of automatic volume control for the amplifier 120, the coil 173 is provided in place of the return spring of the galvanometer. This coil 173 is preferably disposed at right angle to coil 172 so that the galvanometer is caused to take a position corresponding to the angle whose tangent represents the relative strength of the currents in the two coils. By this arrangement the effect of variation in amplitude of the waves fed into detectors 151 and 161 is very greatly minimized especially with regard to reading of phase coincidence. For extreme accuracy, therefore, it is preferred to employ automatic volume control in amplifier 120, to arrange the phase comparison device as shown in Fig. 2, and to employ readings based upon phase coincidence. For this purpose the modulation frequency generator 102 is preferably graduated so as to indicate distances corresponding to ½ a wavelength and the reading is taken at the first phase coincidence. The first phase coincidence will directly indicate the height.

The preferred form of antennae 105 and 109, which are merely schematically represented in Fig. 1, is shown in greater detail in Fig. 3. As can be seen in this figure, each of the antennae 105 and 109 consists essentially of a horizontal radiating wire ¼ of a wavelength long. The lines for feeding energy to antenna 105 and for carrying energy from antenna 109 consist of concentric lines 306 and 310 of the type whose insulation is primarily air and which is adapted for carrying high frequency with little attenuation. In order to match the surge impedances of these transmission lines 306 and 310 to the impedances of the antennae, the antennae are arranged to be grounded by vertical wires 305 and 309, and the central or ungrounded conductor of each transmission line is connected to a suitable point along the L-shaped loop so formed.

In the preferred form of my invention illustrated in Fig. 3, the wings of the aeroplane are of metal, or at least metal covered, so that the above described grounding of the antenna can readily be effected as shown. The outer conductors of the transmission lines 306 and 310 are also grounded to these metal wings and these transmission lines are carried within the wings so as to minimize wind resistance except for a small portion which necessarily extends to the feed point of the antenna as shown. If it is desired to minimize extraneous radiation from the vertical portions 305 and 309, these vertical portions may also be shielded like the coaxial cable.

This particular arrangement of antennae provides an inherently low radiation coupling between the two antennae which is further reduced by the images formed as a result of the large plane conductor constituted by the wings of the aeroplane. Interaction between the antennae is further reduced by the fuselage which is preferably also of metal, or metal covered. The reduction of interaction by these arrangements has the beneficial result that only a small component of interaction remains to be neutralized by network 107. Therefore, the adjustment of network 107 is less critical and less subject to being appreciably altered by the inevitable slight changes in adjustment resulting from time and atmospheric changes.

While I have described certain particular embodiments of my invention for the purposes of illustration, it will be understood that various adaptations and modifications thereof occurring to one skilled in the art may be made within the spirit of the invention as set forth in the appended claims.

What I claim is:

1. The method of ascertaining the distance from a station having a wave source to a reflecting surface, which comprises deriving from said source ultra-short radio waves modulated at a high modulation frequency, transmitting said waves against said surface and after reflection therefrom back to said station, deriving further ultra-short radio waves of the same frequency modulated at the same high modulation frequency from said same source, detecting both said reflecting waves and said further waves to facilitate comparison of the phases of the envelopes of said components, adjusting said modulation frequency to such value that a predetermined phase relation obtains between the envelopes of said reflected waves and said further waves, and determining said distance from said value of modulation frequency.

2. A radio altimeter for indicating the distance from an aircraft to the ground which comprises means for generating ultra-short wave oscillations modulated at a high modulation frequency, means for adjusting said modulation frequency, a first and a second channel, means for transmitting modulated oscillations from said generator directly to said first channel, means for transmitting further similar modulated oscillations from said same generator to the ground and thence by reflection to said second channel, detectors connected in said channels for detecting said oscillations in said channels, and means for comparing the phases of said detected oscillations.

3. A radio altimeter for indicating the distance from an aircraft to the ground which comprises means for generating ultra-short wave oscillations modulated at a high modulation frequency, means for adjusting said modulation frequency, a first and a second channel, means for transmitting modulated oscillations from said generator directly to said first channel, means for transmitting further similar modulated oscillations from said same generator to the ground and thence by reflection to said second channel, detectors connected in said channels for detecting said oscillations in said channels to yield direct current components proportionate to the carrier amplitudes and alternating current components proportionate to the envelope amplitudes, means for vectorially adding said alternating current components, and means for comparing such vectorial sum with at least one of said direct current components.

4. In a radio altimeter for indicating the distance from the ground to a metal-covered airplane having wings and a body, a horizontal linear radiating antenna and a horizontal linear collecting antenna of substantially equal lengths disposed end-on to each other beneath said wings on opposite sides of said body, means for transmitting high frequency modulated ultra-short radio waves whose wave length is substantially four times the length of one of said antennae from said radiating antenna to the ground and thence to said collecting antenna, and adjustable means for transmitting a small component of said waves directly from said radiating antenna to said collecting antenna to neutralize the interaction of said antennae.

ANDREW ALFORD.